(12) United States Patent
Schumacher

(10) Patent No.: US 8,605,274 B2
(45) Date of Patent: Dec. 10, 2013

(54) LASER REFERENCE SYSTEM

(75) Inventor: Lars Schumacher, Relsberg (DE)

(73) Assignee: Trimble Navigation Limited, Sunnyvale, CA (US)

( * ) Notice: Subject to any disclaimer, the term of this patent is extended or adjusted under 35 U.S.C. 154(b) by 326 days.

(21) Appl. No.: 13/012,364

(22) Filed: Jan. 24, 2011

(65) Prior Publication Data

US 2012/0188535 A1   Jul. 26, 2012

(51) Int. Cl.
*G01B 11/26* (2006.01)

(52) U.S. Cl.
USPC ............ 356/140; 356/141.3; 356/141.1; 356/139.03; 141/386; 33/228

(58) Field of Classification Search
USPC ............ 356/140–141, 141.3–141.4; 141/386
See application file for complete search history.

(56) References Cited

U.S. PATENT DOCUMENTS

| | | | |
|---|---|---|---|
| 4,035,084 A * | 7/1977 | Ramsay | ............... 356/139.08 |
| 4,976,538 A | 12/1990 | Ake | |
| 5,196,900 A | 3/1993 | Pettersen | |
| 5,313,409 A * | 5/1994 | Wiklund et al. | ............. 356/4.01 |
| 5,844,679 A | 12/1998 | Detweiler et al. | |
| 5,852,493 A * | 12/1998 | Monnin | ............. 356/141.1 |
| 5,886,776 A | 3/1999 | Yost et al. | |
| 5,898,490 A | 4/1999 | Ohtomo et al. | |
| 5,976,536 A | 11/1999 | Stephens et al. | |
| 6,043,874 A | 3/2000 | Detweiler | |
| 6,055,046 A | 4/2000 | Cain | |
| 6,693,706 B2 | 2/2004 | Kahle et al. | |

* cited by examiner

*Primary Examiner* — Tarifur Chowdhury
*Assistant Examiner* — Isiaka Akanbi
(74) *Attorney, Agent, or Firm* — Dinsmore & Shohl LLP

(57) ABSTRACT

A method of operating a laser reference system orients a reference plane of laser light generated by a transmitter so compensation is made for rake angles between the first and second axes of the transmitter and first and second non-orthogonal alignment axes. The transmitter includes an optical system arranged to generate a laser beam, the optical system projecting said laser beam radially along a rotational arc defined about a central rotational axis, thereby substantially defining a reference plane of laser light, and a positioning arrangement, coupled to said optical system, for adjusting the angular orientation of the optical system with respect to a first transmitter axis and with respect to a second transmitter axis. Detectors are arranged to detect reception of the laser beam.

12 Claims, 9 Drawing Sheets

LASER REFERENCE SYSTEM

CROSS-REFERENCE TO RELATED APPLICATIONS

None.

STATEMENT REGARDING FEDERALLY SPONSORED RESEARCH OR DEVELOPMENT

Not Applicable.

BACKGROUND

This relates generally to a laser transmitter and, more particularly, to a laser reference system and method of orienting a reference plane of laser light generated by a laser transmitter. The laser transmitter is effectively aligned so that the laser transmitter defines a plane having desired slopes in desired alignment directions. The alignment directions need not be orthogonal.

Laser light systems have been employed in numerous prior art surveying and construction applications. In one type of system, a laser light transmitting device provides a rotating laser beam which establishes a reference plane over a work site. Typically, the reference plane creates either a horizontal elevation reference plane, or an appropriately tilted reference plane. The laser light is detected by one or more laser beam detectors. The laser beam detectors are mounted on supports placed at considerable distances from the transmitting device or on construction equipment that is operated at the work site.

Prior to operation, it is necessary to set up the transmitting device at the work site in proper orientation to the work site. As an example, assume that an architect has previously determined that the work site is to slope in a certain direction at a certain grade. Assume further that the work site is rectangular, and that a corner of the work site is selected as the origin of a coordinate system, with one edge of the rectangle being the x-axis and the other edge of the rectangle being the y-axis. The desired fall line may extend in a direction between the x-axis and y-axis. The architect will have specified an x-axis slope and a y-axis slope for the work site that together produce the desired slope along the fall line.

The transmitter is placed at the corner of the work site that constitutes the origin. The transmitter has its own internal x-axis and y-axis, and these are marked on the top of the transmitter. The operator manually lines up the transmitter x and y axes with the work site x and y axes using these markings, or using a telescope that may be mounted on the top of the transmitter for this purpose. Neither of these arrangements for aligning a transmitter permits great precision.

If the transmitter is perfectly aligned such that its x-axis and its y-axis are parallel to the x-axis and y-axis of the work site, respectively, then when the operator inputs the x-axis grade and the y-axis grade, the transmitter will produce a reference plane of light having the correct pitch along the fall line. A problem develops, however, when the x-axis and the y-axis of the transmitter are misaligned, i.e., pivoted slightly clockwise or counterclockwise, as seen from above, with respect to the x-axis and y-axis of the work site. If the transmitter is misaligned and if the operator inputs the desired work site axes slopes, the transmitter will produce a reference light plane having the correct pitch, but the maximum pitch of the reference plane will not be aligned with the desired fall line. Instead, the reference plane will be rotated slightly about a vertical axis from the orientation that is desired.

One system for aligning a transmitter to a work site is shown in U.S. Pat. No. 6,055,046, issued Apr. 25, 2000, to Cain. The system has a transmitter that includes an angle encoder. The angle encoder continuously indicates the angular orientation of the rotating beam. The transmitter and a retroreflective target are positioned along a side of the work site, spaced apart in the direction to which the laser transmitter is to be aligned. The angular orientation of the target is then determined by the angle encoder output when light is reflected from the target back to the transmitter. Alternatively, an electro-optical detector may be used with the detector, sending a signal via a radio or other transmitter back to a receiver on the transmitter when the beam is detected. In either event, the transmitter axes are rotated into alignment electronically. This arrangement requires an accurate angle encoder, thus adding to the expense and complication in the construction of the device.

Another system for aligning a transmitter, shown in U.S. Pat. No. 6,693,706, issued Feb. 17, 2004, to Kahle, determines the amount of transmitter misalignment about a vertical axis (termed "the rake angle") and then compensates for it. Stated another way, the grade rake angle is the angular misalignment (as seen from above) of the x and y axes of the transmitter, and the x and y axes of the work site, respectively. This system determines this rake angle and alters the operation of the transmitter such that a properly oriented reference plane is produced.

These prior art systems were limited to determining and compensating for alignment directions that are orthogonal, such that the x-axis and the y-axis of the transmitter, which are also orthogonal, will be offset from the alignment directions by the same rake angle. This is not always the case, however. Furthermore, it may sometimes be desirable to match a grade defined by the transmitter and two beam detectors, and then determine the inclination of the matched grade in the two alignment directions. Accordingly, it is seen that there is a need for an improved and simplified system for aligning a laser transmitter to a work site, such that a plane of laser light projected from the laser transmitter accurately defines a reference plane with a properly oriented slope.

SUMMARY

A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected by first and second detectors, includes the steps of defining a first alignment direction from the transmitter by positioning the first detector in the first alignment direction for illumination with the plane of laser light, and defining a second alignment direction from the transmitter by positioning the second detector in the second alignment direction for illumination with the plane of laser light. The method further includes the steps of determining the orientation of the first alignment direction with respect to the first and second transmitter axes, determining the orientation of the second alignment direction with respect to the first and second transmitter axes, and specifying the desired orientation of the reference plane in the first and second alignment directions. Finally, the method includes the steps of determining the angular orientation of the reference plane with respect to the first transmitter axis and with respect to the second transmitter axis needed to position the reference plane in the desired orientation, and orienting the reference plane with respect to the first and second transmitter axes such that the desired orientation of the reference plane in the first and second alignment directions is achieved.

The step of determining the orientation of the first alignment direction with respect to the first and second transmitter axes may include the steps of determining the inclination in the direction of the first and second transmitter axes of a first plane which is detected by the first detector, and determining the inclination in the direction of the first and second transmitter axes of a second plane which is detected by the first detector. The step of determining the orientation of the second alignment direction with respect to the first and second transmitter axes may include the steps of determining the inclination in the direction of the first and second transmitter axes of a first plane which is detected by the second detector, and determining the inclination in the direction of the first and second transmitter axes of a second plane which is detected by the second detector.

The step of determining the angular orientation of the reference plane with respect to the first transmitter axis and with respect to the second transmitter axis needed to position the reference plane in the desired orientation may include the step of using the equations:

$$\tan(\alpha y) = \frac{\tan(\alpha x') \cdot \sqrt{1+\tan^2(\delta x)} - \tan(\alpha y') \cdot \sqrt{1+\tan^2(\delta y)}}{\tan(\delta x) - \tan(\delta y)}$$

and $$\tan(\alpha x) = \frac{\tan(\alpha y')}{\cos(\delta y)} - \tan(\alpha y) \cdot \tan(\delta y)$$

where αx' and αy' are the orientations of the reference plane along the first and second alignment directions, δx and δy are the rake angles of the first and second alignment axes with respect to the first transmitter axis, and αx and αy are the orientations of the reference plane along the first and second transmitter axes.

A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected by first and second detectors, may include the steps of defining a first alignment direction from the transmitter by positioning the first detector in the first alignment direction for illumination with the plane of laser light, the first detector further defining the grade of the reference plane of laser light by its vertical position with respect to the transmitter, and defining a second alignment direction from the transmitter by positioning the second detector in the second alignment direction for illumination with the plane of laser light, the second detector further defining the grade of the reference plane of laser light by its vertical position with respect to the transmitter. The method further includes the steps of determining the orientation of the first alignment direction with respect to the first and second transmitter axes, determining the orientation of the second alignment direction with respect to the first and second transmitter axes, and orienting the reference plane in the first alignment direction such that the first detector is illuminated. Finally, the method may further include the steps of orienting the reference plane in the second alignment direction such that the second detector is illuminated, determining the angular orientation of the reference plane with respect to the first transmitter axis and with respect to the second transmitter axis that results when both the first detector and the second detector are simultaneously illuminated and determining the resulting orientation of the reference plane in both the first alignment direction and the second alignment direction.

The step of determining the orientation of the first alignment direction with respect to the first and second transmitter axes may include the steps of determining the inclination in the direction of the first and second transmitter axes of a first plane which is detected by the first detector, and determining the inclination in the direction of the first and second transmitter axes of a second plane which is detected by the first detector. The step of determining the orientation of the second alignment direction with respect to the first and second transmitter axes may include the steps of determining the inclination in the direction of the first and second transmitter axes of a first plane which is detected by the second detector, and determining the inclination in the direction of the first and second transmitter axes of a second plane which is detected by the second detector.

The step of determining the resulting orientation of the reference plane in both the first alignment direction and the second alignment direction may comprise the step of using the equations:

$$\tan(\alpha y') = \frac{\tan(\alpha x) + \tan(\alpha y) \cdot \tan(\delta y)}{\sqrt{1+\tan^2(\delta y)}}$$

and $$\tan(\alpha x') = \frac{\tan(\alpha x) + \tan(\alpha y) \cdot \tan(\delta x)}{\sqrt{1+\tan^2(\delta x)}}$$

where αx' and αy' are the orientations of the reference plane along the first and second alignment directions, δx and δy are the rake angles of the first and second alignment axes with respect to the first transmitter axis, and αx and αy are the orientations of the reference plane along the first and second transmitter axes.

DETAILED DESCRIPTION

Figure 1:
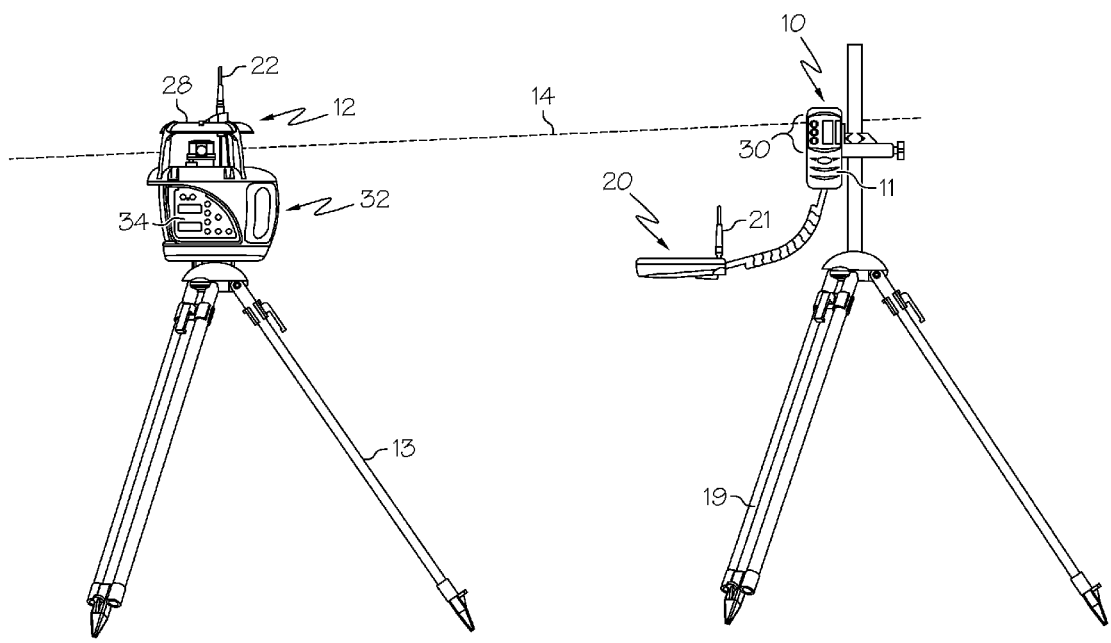
FIG. 1 is a side view of a prior art laser reference system of the type disclosed in U.S. Pat. No. 6,693,706.

Reference is now made to FIGS. 1-4 of the drawings, which illustrate a laser reference system of the type disclosed in U.S. Pat. No. 6,693,706, issued Feb. 17, 2004, to Kahle et al, the entire disclosure of which is incorporated by reference herein. Shown are a detector 10, including a laser light receiver or detector 11, and a transmitter 12. The transmitter 12, mounted on tripod support 13, includes an optical system arranged to generate a laser beam, indicated by reference numeral 14. The optical system projects the laser beam radially along a rotational arc defined about a central rotational axis, thereby substantially defining a reference plane of laser light. The optical system preferably includes a rotating pentaprism mechanism which insures that the radially directed beam of laser light is maintained precisely within a desired plane. Such an arrangement generally of this type is shown, for example, in U.S. Pat. No. 5,852,493, issued Dec. 22, 1998 to Monnin. The Monnin patent is incorporated herein by reference.

The transmitter 12 includes a positioning arrangement, coupled to said optical system, for adjusting an angular orientation of the optical system with respect to a first transmitter axis 16 and with respect to a second transmitter axis 18. Transmitter axis 16 is perpendicular to transmitter axis 18. The detector 10, mounded on tripod support 19, further includes a hand-held remote control transmitter 20 which transmits instructions and information from its remote location to an appropriate receiver in the transmitter 12 via antennae 21 and 22. The transmitter 20 is illustrated as a radio transmitter. Any suitable form of transmission may be used, however. Markings 24 and 26 are included on the top of the sunshade 28 to permit an initial rough alignment of the transmitter 12.

The detector 10 is arranged to detect reception of the laser beam 14. The detector 10 includes a generally vertically arranged row of detector elements such as shown in U.S. Pat. No. 5,886,776, issued Mar. 23, 1999, to Yost, or other arrangement, such as the pair of triangular photodetectors shown in U.S. Pat. No. 4,976,538, issued Dec. 11, 1990, to Ake. The Yost and Ake patents are incorporated herein by reference. The detector 10 may be arranged to detect reception of said plane of laser light 16 along a generally vertical detector line extending generally along the edge 30 of the detector. The detector then transmits information regarding the location of the laser beam 14 to a processor 32 in the transmitter 12. Typically, detection of the plane of laser light at the center of the detector is referenced as detecting an "on grade" condition.

Figure 2:
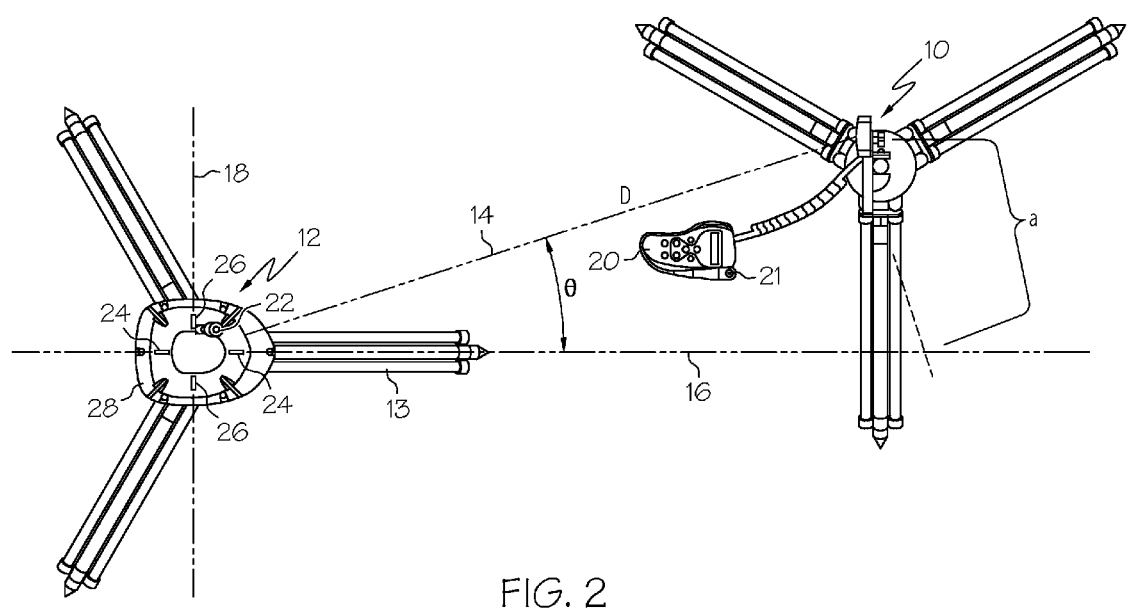
FIG. 2 is a view of the laser reference system of FIG. 1, as seen from above.
Figures 3A, 3B:
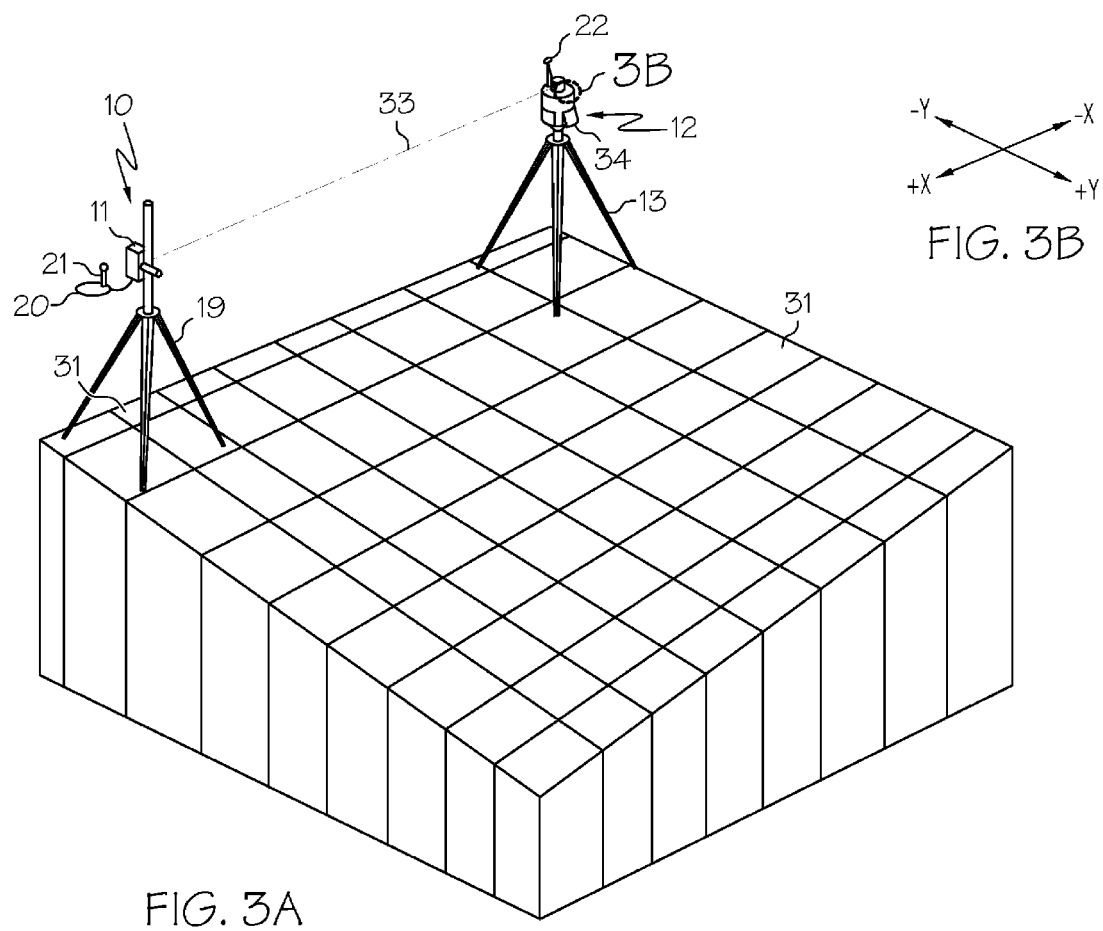
FIG. 3A is a schematic orthogonal view, illustrating a work site set up with the laser reference system of FIG. 1.
FIG. 3B illustrates the orientation of the x and y axes of the transmitter of FIG. 3A.
Figure 4:
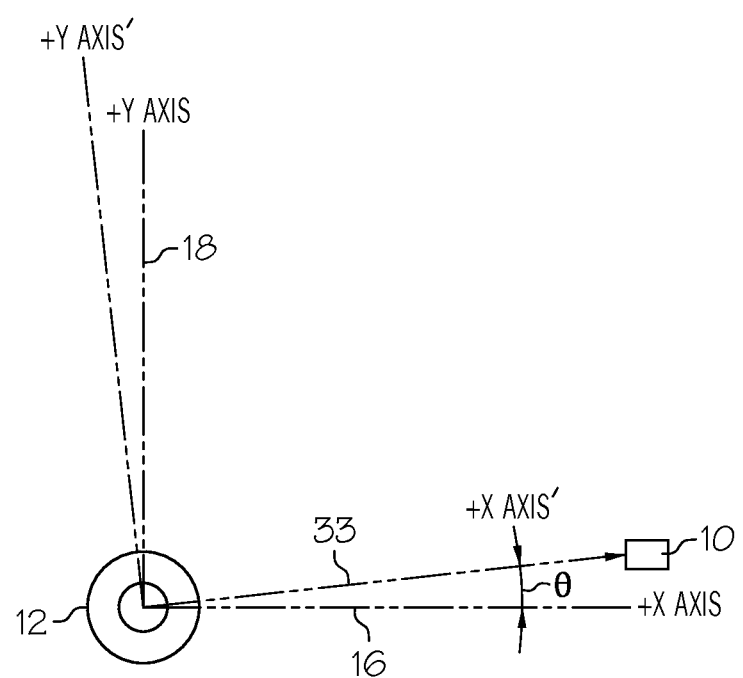
FIG. 4 is a schematic plan view of a transmitter and detector in the laser reference system of FIG. 1, illustrating the grade rake angle θ of the transmitter.

As seen in FIGS. 3A and 3B, the transmitter 12 and the detector 10 are positioned at a work site 31 along a line which may be termed the alignment direction 33. The alignment direction is fixed with respect to the specific worksite. Every transmitter projects a beam with respect to first and second transmitter axes, indicated as axes x and y in FIG. 3B, respectively. When the operator of the transmitter 12 inputs previously determined pitch or slope angles, these angles are given for the alignment direction and for a direction perpendicular to the alignment direction. The angular difference θ between the alignment direction and an axis of the transmitter is termed the grade rake or rake angle, as shown in FIGS. 2 and 4.

The processor 32 is processor adapted to receive the transmitted information and arranged to determine the distance in an alignment direction between the transmitter 12 and the detector 10. The processor 32 determines the distance from said detector 10 to the first transmitter axis 16 in a direction generally perpendicular to the alignment direction, and calculates the rake angle θ between said first transmitter axis 16 and an alignment direction that extends generally from the transmitter 12 to the detector 10. It will be appreciated that if the transmitter 12 were set up perfectly at the outset, the rake angle θ would be zero and any desired pitch angle of the plane of laser light in the alignment direction and any desired pitch angle of the plane of laser light in a direction perpendicular to the alignment direction would equal the pitch angle of the plane of laser light in the direction of the first and second transmitter axes, respectively. As a consequence, it would be possible for the operator to enter the pitch angles for the two transmitter axes directly into the processor to achieve the desired orientation for the plane of laser light.

By a method disclosed in the Kahle patent, the rake angle θ may be determined and then appropriate adjustment is made for this offset between the first and second transmitter axes, and the alignment direction and a direction perpendicular to the alignment direction, respectively. The transmitter 12 includes an input 34 for inputting a first desired slope for the reference plane of laser light in the alignment direction and a second desired slope in a direction perpendicular thereto. The processor 32 calculates a first calculated slope and a second calculated slope based on the calculated rake angle, so that the plane through which the laser beam is projected has the first desired slope in the alignment direction and the second desired slope in a direction perpendicular thereto. It will be appreciated that, if desired, the processor 32 may also be located at the detector 10, or that, if desired, the processor 32 may be located at the transmitter 12, as shown, but desired slopes entered at the detector 10 and transmitted to the transmitter 13 via the transmitter 20.

The processor 32 determines the distance in an alignment direction from the transmitter 12 to the detector 10 by directing the beam 14 in succession to illuminate two detector elements spaced vertically along the row 30. Preferably, the beam will illuminate detectors at the top of row 30, and at the bottom of the row 30. The processor 32 then determines the included vertical angle of the reference plane as it shifts from illuminating one of the two detector elements to illuminating the other of the two detector elements. The distance between the transmitter and the detector is then computed, based on the known height difference between the two detector elements and based on the included vertical angle. This distance is computed as the ratio of the known height difference to the tangent of the included vertical angle.

Next, the processor 32 determines the distance from the detector 10 to the first transmitter axis 16 in a direction generally perpendicular to the alignment direction by illuminating the center of the row of elements with the reference plane horizontal in the direction of the second transmitter axis, and tilting the reference plane in the direction of the second transmitter axis until a detector element, vertically displaced from the center of the row of elements, is illuminated. Preferably, the vertically displaced element is the top or bottom element in the row 32. The angle by which the reference plane is tilted in the direction of the second transmitter axis is then determined. Finally, the processor 32 computes the distance from the detector 10 to the first transmitter axis 16 in a direction generally perpendicular to the alignment direction based on the height difference between the center of the row of elements and detector element that is vertically displaced from the center of the row of elements, and on the angle by which the reference plane is tilted. The distance from the detector 10 to the first transmitter axis 16 is equal to the height difference between the center of the row of elements and detector element that is vertically displaced from the center of the row of elements divided by the tangent of the angle by which the reference plane is tilted. The rake angle θ is then calculated as the arctangent of the ratio of the distance "a" from the detector to the first transmitter axis in a direction generally perpendicular to the alignment direction, to the distance "D" in an alignment direction from the transmitter 12 to the detector 10.

It will be appreciated that the above description is presented in terms of a plurality of discrete detector elements positioned in a generally vertical row, and the beam of laser light being directed at the detector elements in the row 30. It will also be understood, however, that any sort of known laser beam detection arrangement may be used to detect the position of the beam in lieu of a row of detector elements.

The Kahle patent suggests an alternative method to orient a reference plane of laser light generated by a transmitter. In this method, an alignment direction is defining from the transmitter 12 by positioning the detector 10 in the alignment direction and illuminating the detector with the plane of laser light. The reference plane defined by the rotating laser beam is then tilted in the direction of the first transmitter axis 16 while keeping the reference plane substantially horizontal in the direction of the second transmitter axis. The reference plane of laser light is then effectively rotated such that a predetermined point on the detector line is illuminated at two effective angular positions of rotation of the plane. A midpoint between the two effective angular positions is then determined as the first transmitter axis. An angular position at ninety degrees thereto is determining as the second transmitter axis. The angular difference between the alignment direction and the first transmitter axis is determined as the rake angle. Finally, taking into account the rake angle, the reference plane is oriented with respect to the first and second transmitter axes such that a desired orientation with respect to the alignment direction and a direction perpendicular thereto is achieved.

Yet another alternative method of orienting a reference plane of laser light generated by a transmitter 12 is suggested by the Kahle patent. As with the previously described methods, an alignment direction from the transmitter is initially defined by positioning a detector 10 in the alignment direction for illumination with the plane of laser light. The reference plane is tilted and a grade $x_1$ is determined in a direction of the first transmitter axis 16 and a grade $y_1$ is determined in a direction of the second transmitter axis 18. The selected grades $x_1$ and $y_1$ cause a point on the generally vertical detector line 30 to be illuminated with the reference plane. Next, the reference plane is titled and a grade $x_2$ is determined in a direction of the first transmitter axis 16 and a grade $y_2$ in a direction of the second transmitter axis 18 which cause the same point on the generally vertical detector line 30 to be illuminated. The rake angle θ between the first transmitter axis 16 and the alignment direction 14 is then calculated based on grades $x_1$, $x_2$, $y_1$, $y_2$. Finally, the reference plane is oriented with respect to the first and second transmitter axes such that a desired orientation with respect to the alignment direction and a direction perpendicular thereto is achieved.

The step of calculating the rake angle 8 between the first transmitter axis and the alignment direction includes the step of calculating the rake angle according to the equation:

$$\theta = \arctan((y_1 - y_2)/(x_1 - x_2)).$$

The step of orienting the reference plane with respect to the first and second transmitter axes such that a desired orientation with respect to the alignment direction and a direction perpendicular thereto is achieved, comprises the step of orienting the reference plane with respect to the first and second transmitter axes according to the equations:

$$x = x' \cos(\theta) - y' \sin(\theta), \text{ and}$$

$$y = x' \sin(\theta) + y' \cos(\theta),$$

where x' and y' are the desired grades in the alignment direction and a direction perpendicular thereto, and x and y are the grades in the first and second transmitter axes, as shown in FIG. 4. FIG. 4 is a schematic plan view of a transmitter 12 and detector 10, illustrating the grade rake angle θ which is the angular misalignment between the transmitter axes (+x axis and +y axis) and the axes of the work site for which the desired grades have previously been determined.

It will be appreciated that these are equations describing the rotation of axes in a plane. Here x and y are the actual orthogonal grades of the mechanical system, and x' and y' are the desired grades along the directions indicated by the rotation angle denoted by θ.

Equations for solution of the grade rake angle θ are as follows. The alignment of the system has the property that the rotated coordinate of the primary axis remains constant for different cross grades. For instance, suppose we rotate the axes, choose a value for θ, to have x' aligned with a certain direction. Then, for a specific point along that direction, x' will remain constant for different values of y'. If we now pick two measurement points, using the equations above we have:

$$x_1 = x'^* \cos(\theta) - y_1'^* \sin(\theta)$$

$$y_1 = x'^* \sin(\theta) + y_1'^* \cos(\theta)$$

$$x_2 = x'^* \cos(\theta) - y_2'^* \sin(\theta)$$

$$y_2 = x'^* \sin(\theta) + y_2'^* \cos(\theta)$$

Solving these equations for x' we get:

$$(x_1 + y_1'^* \sin(\theta))/\cos(\theta) = x'$$

$$(y_1 - y_1'^* \cos(\theta))/\sin(\theta) = x'$$

$$(x_2 + y_2'^* \sin(\theta))/\cos(\theta) = x'$$

$$(y_2 - y_2'^* \cos(\theta))/\sin(\theta) = x'$$

Next, equate the two equations divided by cos(θ) and sin(θ) to get:

$$(x_1 + y_1'^* \sin(\theta)) = (x_2 + y_2'^* \sin(\theta))$$

$$(y_1 - y_1'^* \cos(\theta)) = (y_2 - y_2'^* \cos(\theta))$$

Or, reshuffled we get:

$$-(x_1 - x_2) = (y_1' - y_2')^* \sin(\theta)$$

$$(y_1 - y_2) = (y_1' - y_2')^* \cos(\theta)$$

It is desirable to eliminate $y_1'$ and $y_2'$:

$$\theta = \arctan(-(x_1 - x_2)/(y_1 - y_2))$$

The solution for axis alignment of the y' axis is similar to that if the x', but not identical. Using the same method as before, we can derive:

$$\theta = \arctan((y_1 - y_2)/(x_1 - x_2)).$$

Thus, as described previously, it remains to find two distinct combinations of grades ($x_1$, $y_1$) and ($x_2$, $y_2$) that will reflect the same grade x' along the direction of interest. More combinations of grades could lead to a better approximation of the value of the arctangent using a least squares fit or some other estimation technique.

The description above illustrated the processor 32 as resident in the transmitter. The processor 32 controls the operation of the transmitter 12 to effect the steps needed to determine and correct the rake angle θ. The processor 32 receives the data from the detector via radio transmission. It will be appreciated, however, that the processor could, if desired, be located in at the detector 10, and transmit control instructions to the transmitter 12, rather than detection data, as is the case with the described embodiments. In this respect, the location of the processor 32 is not a significant feature of the system.

It will also be appreciated that the precise manner of communication between the detector, the processor and the transmitter is also not crucial.

It will also be appreciated that the method may be used in conjunction with a laser system of the type in which the beam of laser light is directed toward a retroreflective target which reflects the beam back to the transmitter with information regarding the relative position of the beam on the target. Such a system is shown in U.S. Pat. No. 5,844,679, issued Dec. 1, 1998, to Detweiler et al. Such a system provides a target which extends generally vertically along a target line. The reflected light from the target is modulated and the modulations sensed at the transmitter to determine the location of the beam of light. The disclosure of Detweiler et al is incorporated herein by reference.

Figure 5:
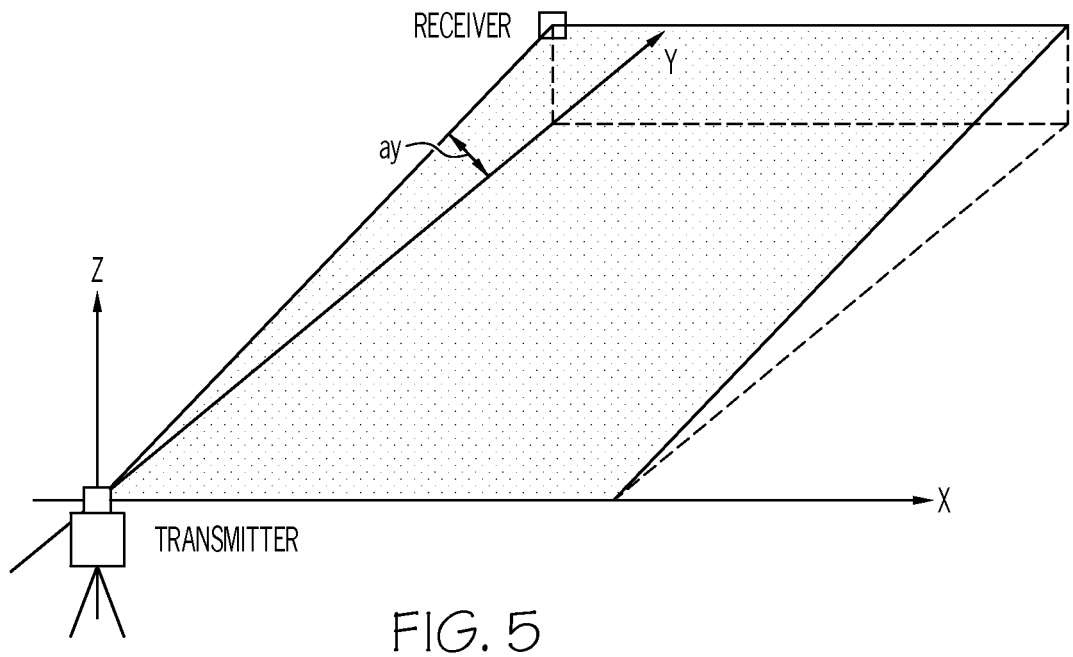
FIGS. 5-13 are schematic orthogonal views, showing a transmitter and one or two detectors or receivers, useful in explaining the improved embodiments of the method.
Figure 6:
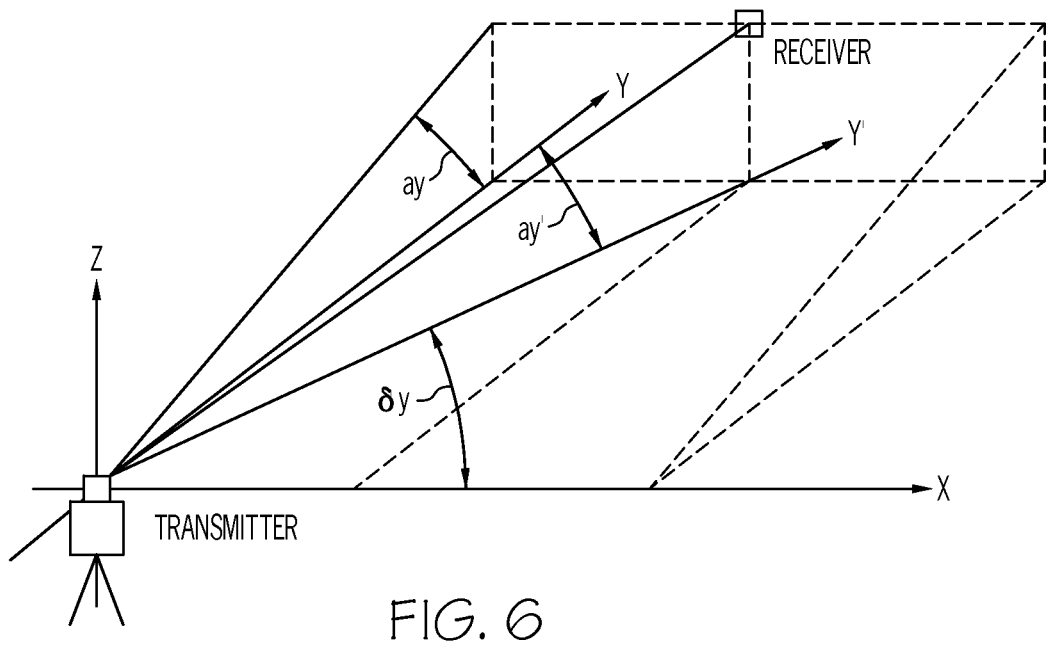
Figure 7:
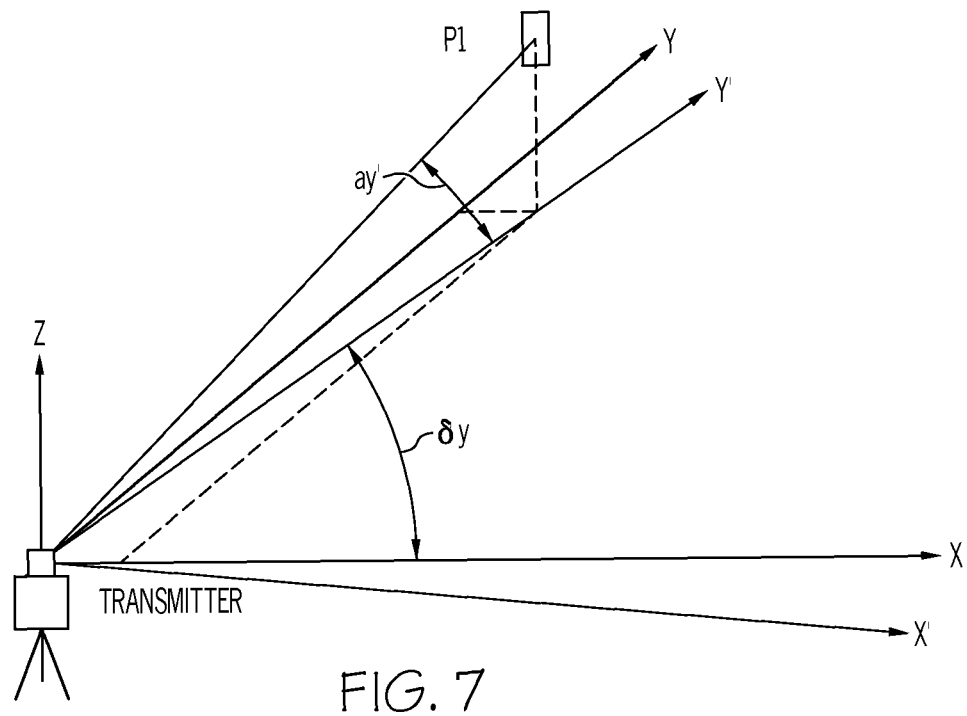

Reference is made to FIGS. 5-13, which are useful in explaining the embodiments in which the reference plane orientation is defined in multiple non-orthogonal alignment directions. FIG. 5 shows a typical application of a laser transmitter in combination with a laser receiver. Usually the operator chooses a grade (ay°) in a desired direction and the laser transmitter adjust the plane in space based on internal grade sensors. This particular example shows a grade (ay°) in the Y-direction. The difficulty for the user is to find the transmitter y-axis in space because only in that direction is the chosen grade angle valid. As explained previously, to support the user in the field, the transmitter has usually alignment marks or a scope on the top housing but with limited accuracy. If the operator misaligns the receiver, this will end up in a wrong grade (ay') between the transmitter and receiver (see FIG. 6). The grade in this example in ay' direction is different compared to ay which has been chosen by the user. As an example, if the user chooses ay=15°, with a misalignment of 10° (δy=80°), ay' would be 14.78°.

As discussed previously, and as illustrated in FIG. 7, the Kahle patent describes one way to resolve this problem. If the transmitter processor knows the rake angle (δy), the unit can execute a coordinate transformation calculation to reach the desired ay grade angle in the y'-axis direction. The operator knows that the chosen grade angle is valid in the y'-axis direction, the user axis defined by the receiver position. The method disclosed in the Kahle patent is, however, limited in that the second alignment direction is always orthogonal to the first alignment direction.

Figure 8:
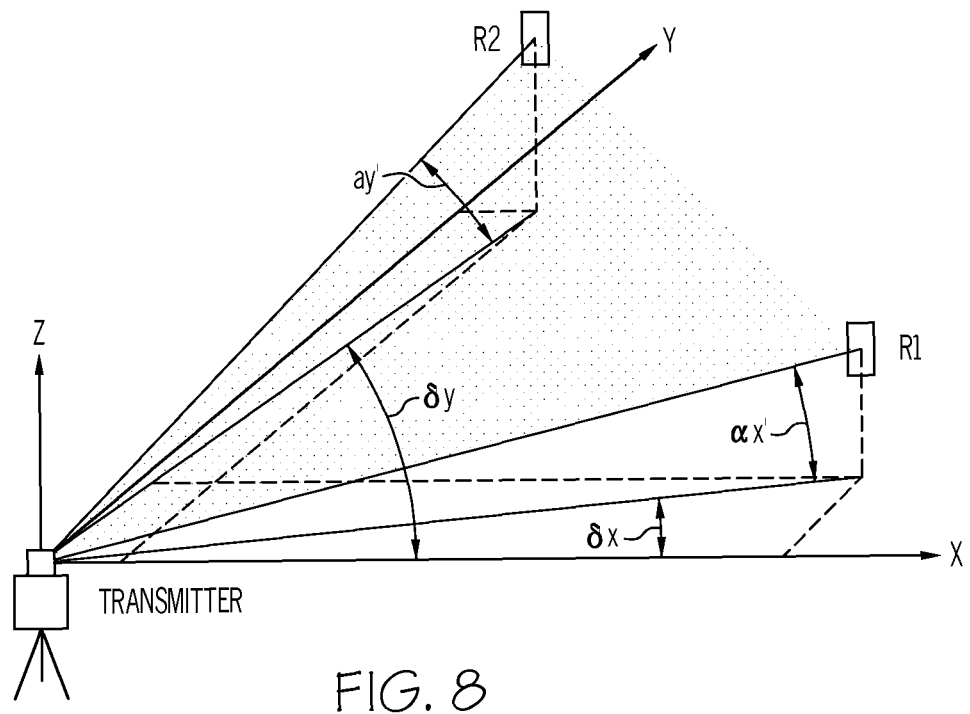

FIG. 8 illustrates the situation in which two detectors or receivers are used to define the first and second alignment directions, with the first and second alignment directions being non-orthogonal. By using two receivers, a grade adjustment can be performed regardless of the direction of the axes. The user is able to select desired grade angles in the two alignment directions defined by these receivers.

The following steps may be implemented to accomplish this.

1.) Perform adjustment to "on grade" of Receiver 1.
2.) Store the corresponding angles in X- and Y-direction (αx1, αy1).
3.) Perform a second adjustment to "on grade" of Receiver 1 with different angles (αx2, αy2)
4.) Calculate rake angle δx with the formula described in the Kahle patent:

$$\tan(\delta x) = \frac{\tan(\alpha x2) - \tan(\alpha x1)}{\tan(\alpha y1) - \tan(\alpha y2)} \quad \text{(F5)}$$

5.) Perform adjustment to "on grade" of Receiver 2.
6.) Store the corresponding angles in X- and Y-direction (αx3, αy3).
7.) Perform a second adjustment to "on grade" of Receiver 2 with different angles (αx4, αy4).
8.) Calculate rake angle δy with the formula described in the Kahle patent.

$$\tan(\delta y) = \frac{\tan(\alpha x4) - \tan(\alpha x3)}{\tan(\alpha y3) - \tan(\alpha y4)}$$

9.) Use $\tan(\alpha y) =$ (F2)

$$\frac{\tan(\alpha x') \cdot \sqrt{1 + \tan^2(\delta x)} - \tan(\alpha y') \cdot \sqrt{1 + \tan^2(\delta y)}}{\tan(\delta x) - \tan(\delta y)}$$

and $$\tan(\alpha x) = \frac{\tan(\alpha y')}{\cos(\delta y)} - \tan(\alpha y) \cdot \tan(\delta y) \quad \text{(F1}\mu\text{C)}$$

to get the corresponding angles for the transmitter axes.

The operator will see the desired grade angles in the alignment directions defined by the position of the receivers. The transmitter would setup the internal slopes (αx,αy) as calculated, above.

Derivation of the Needed Formulas:

$$P1 = (X1/X1 \cdot \tan(\delta x)/\tan(\alpha x') \cdot \sqrt{X1^2 + X1^2 \cdot \tan^2(\delta x)})$$

$$P2 = (X2/X2 \cdot \tan(\delta y)/\tan(\alpha y') \cdot \sqrt{X2^2 + X2^2 \cdot \tan^2(\delta y)})$$

The plane in 3D-coordinates is defined by f(x,y)=ax+by+z (z is always 0 because the transmitter defines the coordinate system and is located at the origin of the system).

$$f(x,y) = ax + by = \tan(\alpha x) \cdot x + \tan(\alpha y) \cdot y$$

->

$$f(P1) = P1z = \tan(\alpha x') \cdot \sqrt{X1^2 + X1^2 \cdot \tan^2(\delta x)}) = \tan(\alpha x) \cdot X1 + \tan(\alpha y) \cdot X1 \cdot \tan(\delta x)$$

$$f(P2) = P2z = \tan(\alpha y') \cdot \sqrt{X2^2 + X2^2 \cdot \tan^2(\delta y)}) = \tan(\alpha x) \cdot X2 + \tan(\alpha y) \cdot X2 \cdot \tan(\delta y)$$

For Grade Rake:
 Reshuffled f(P2) yields:

$$\tan(\alpha x) = \tan(\alpha y') \cdot \sqrt{1 + \tan^2(\delta y)} - \tan(\alpha y) \cdot \tan(\delta y) \quad \text{(F1)}$$

Inserting in f(P1) results in:

$$\tan(\alpha y) = \frac{\tan(\alpha x') \cdot \sqrt{1 + \tan^2(\delta x)} - \tan(\alpha y') \cdot \sqrt{1 + \tan^2(\delta y)}}{\tan(\delta x) - \tan(\delta y)} \quad \text{(F2)}$$

For better use in a μC-system the formula (F1) & (F2) should be reshuffled:
With the general use of:

$$\sqrt{1 + \tan^2(\delta)} = \frac{1}{\cos(\delta)}$$

Leads to (F1μC):

$$\tan(\alpha x) = \tan(\alpha y') \cdot \sqrt{1 + \tan^2(\delta y)} - \tan(\alpha y) \cdot \tan(\delta y) \quad \text{(F1}\mu\text{C)}$$

-continued $$\tan(\alpha x) = \frac{\tan(\alpha y')}{\cos(\delta y)} - \tan(\alpha y) = \cdot \tan(\delta y)$$

and leads to (F2μC):

$$\tan(\alpha y) = \frac{\tan(\alpha x') \cdot \sqrt{1 + \tan^2(\delta x)} - \tan(\alpha y') \cdot \sqrt{1 + \tan^2(\delta y)}}{\tan(\delta x) - \tan(\delta y)} \quad \text{(F2μC)}$$

$$= \frac{\tan(\alpha x') \cdot \frac{1}{\cos(\delta x)} - \tan(\alpha y') \cdot \frac{1}{\cos(\delta y)}}{\frac{\sin(\delta x)}{\cos(\delta x)} - \frac{\sin(\delta y)}{\cos(\delta y)}}$$

$$= \frac{\tan(\alpha x') \cdot \cos(\delta y) - \tan(\alpha y') \cdot \cos(\delta x)}{\sin(\delta x) \cdot \cos(\delta y) - \sin(\delta y) \cdot \cos(\delta x)}$$

$$= \frac{\tan(\alpha x') \cdot \cos(\delta y) - \tan(\alpha y') \cdot \cos(\delta x)}{\sin(\delta x - \delta y)}$$

For Grade Match:
Reshuffled f(P1) we get:

$$\tan(\alpha x') = \frac{\tan(\alpha x) + \tan(\alpha y) \cdot \tan(\delta x)}{\sqrt{1 + \tan^2(\delta x)}} \quad \text{(F3)}$$

Reshuffled f(P2) we get:

$$\tan(\alpha y') = \frac{\tan(\alpha x) + \tan(\alpha y) \cdot \tan(\delta y)}{\sqrt{1 + \tan^2(\delta y)}} \quad \text{(F4)}$$

For better use in a μC-system the formula (F3) & (F4) should be reshuffled:
With the general use of:

$$\sqrt{1 + \tan^2(\delta)} = 1/\cos(\delta)$$

Leads to (F3μC):

$$\tan(\alpha x') = \frac{\tan(\alpha x) + \tan(\alpha y) \cdot \tan(\delta x)}{\sqrt{1 + \tan^2(\delta x)}} \quad \text{(F3μC)}$$

$$\tan(\alpha x') = \tan(\alpha x) \cdot \cos(\delta x) + \tan(\alpha y) \cdot \sin(\delta x)$$

and leads to (F4μC):

$$\tan(\alpha y') = \frac{\tan(\alpha x) + \tan(\alpha y) \cdot \tan(\delta y)}{\sqrt{1 + \tan^2(\delta y)}} \quad \text{(F4μC)}$$

$$\tan(\alpha y') = \tan(\alpha x) \cdot \cos(\delta y) + \tan(\alpha y) \cdot \sin(\delta y)$$

Figure 9:
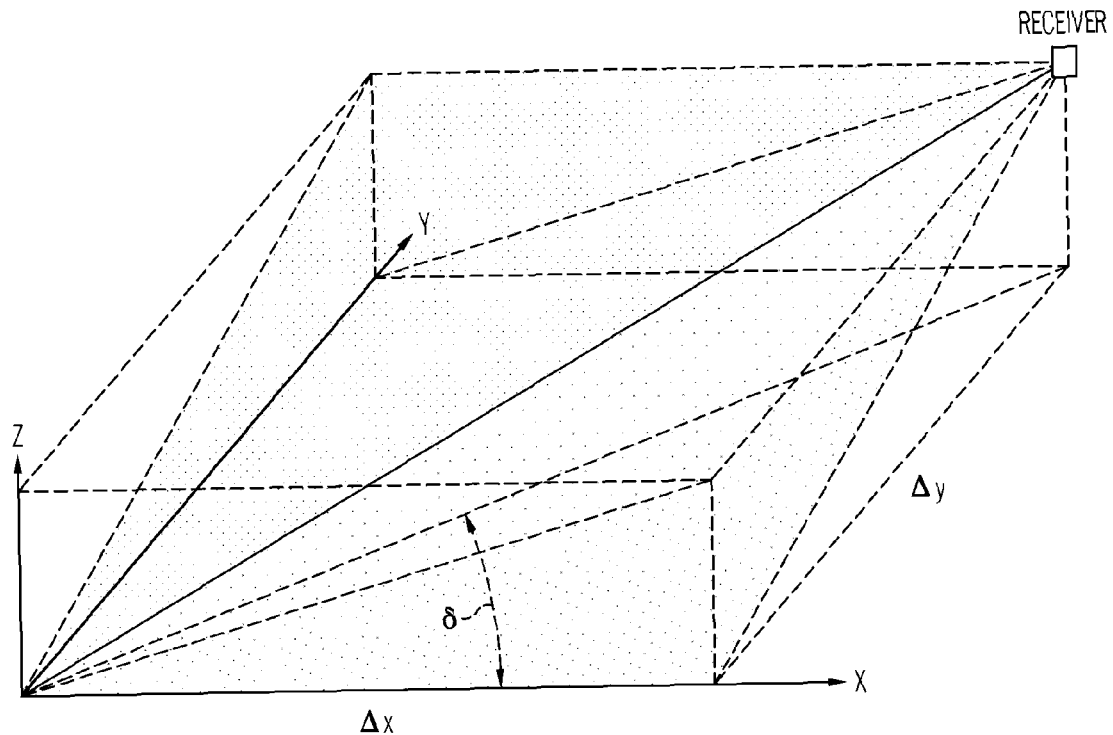

With two measurements it is possible to calculate δ.
Derivation δ:
FIG. 9 shows two planes in space. Both planes are intersecting the origin of the coordinate system and the Receiver.

$$f1(x, y) = a1 \cdot x + b1 \cdot y = \tan(\alpha x1) \cdot x + \tan(\alpha y1) \cdot y$$

$$f2(x, y) = a2 \cdot x + b2 \cdot y = \tan(\alpha x2) \cdot x + \tan(\alpha y2) \cdot y$$

The line of intersection is then:

$$f1(x, y) = f2(x, y) \quad \text{(F5)}$$

$$\rightarrow$$

$$\tan(\alpha x1) \cdot x + \tan(\alpha y1) \cdot y = \tan(\alpha x2) \cdot x + \tan(\alpha y2) \cdot y$$

$$y = \frac{\tan(\alpha x1) - \tan(\alpha x2)}{\tan(\alpha y2) - \tan(\alpha y1)} \cdot x = \frac{\Delta y}{\Delta x} \cdot x = \tan(\delta) * x$$

$$\rightarrow \tan(\delta) = \frac{\tan(\alpha x2) - \tan(\alpha x1)}{\tan(\alpha y1) - \tan(\alpha y2)}$$

Grade Rake Single Axis (Example)

Figure 10:
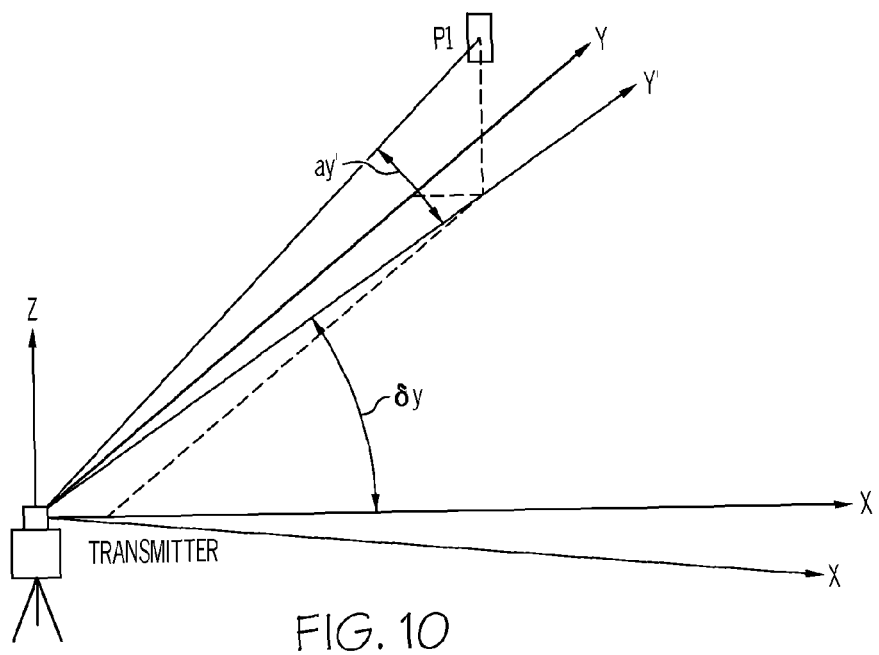

Reference is made to FIG. 10. For this feature, one receiver is needed. The user positions the receiver in the Y+ direction. The transmitter will find the position of the receiver and levels to the desired value. The chosen X'-axis grade value is in a perpendicular angle to the Y'-axis.

Given:
Position transmitter: P0=(0/0/0)
Position receiver 1: P1=(4/20/2) to get the direction of the αy'-axis
angle δ can be calculated for the verification:

$$\delta y = \arctan\left(\frac{P1y}{P1x}\right) = \arctan\left(\frac{20}{4}\right) = 78{,}69°$$

The procedure for the transmitter to determine the angle δ by taking two different measurements is as follows.
1. measurement:

$$\alpha x1 = 0$$

$$\alpha y1 = \arctan\left(\frac{P1z}{P1y}\right) = \arctan\left(\frac{2}{20}\right) = 5{,}711°$$

2. measurement:

$$\alpha y2 = 0$$

$$\alpha x2 = \arctan\left(\frac{P1z}{P1x}\right) = \arctan\left(\frac{2}{4}\right) = 26{,}565°$$

This is known by the transmitter after an "on grade" signal is received by the laser receiver.
→Calculate δ with (F5):

$$\delta y = \arctan\left(\frac{\tan(\alpha x2) - \tan(\alpha x1)}{\tan(\alpha y1) - \tan(\alpha y2)}\right)$$

$$= \arctan\left(\frac{\tan(26{,}565°) - 0}{\tan(5{,}711°) - 0}\right)$$

$$= 78{,}69°$$

The user chooses:
αx'=1°
αy'=4°
In this particular case (grade rake single axis) δx=δy−90°.
Using (F1) and (F2):

$$\alpha y = \arctan\left(\frac{\tan(\alpha x') \cdot \sqrt{1+\tan^2(\delta x)} - \tan(\alpha y') \cdot \sqrt{1+\tan^2(\delta y)}}{\tan(\delta x) - \tan(\delta y)}\right)$$

$$= \arctan\left(\frac{\tan(1°) \cdot \sqrt{1+\tan^2(78,69°-90°)} -}{\tan(78,69°-90°) - \tan(78,69°)}\right)$$

$$= 3,727°$$

and $$\alpha x = \arctan\left(\tan(\alpha y') \cdot \sqrt{1+\tan^2(\delta y)} - \tan(\alpha y) \cdot \tan(\delta y)\right)$$

$$= \arctan\left(\tan(4°) \cdot \sqrt{1+\tan^2(78,69°)} - \tan(3,727°) \cdot \tan(78,69°)\right)$$

$$= 1,767°$$

In conclusion, if the receiver is positioned in a 78.69° rake angle and the user chooses αx'=1°, αy'=4°, the transmitter has to adjust the X-axis to αx=1,767° and Y-axis to αy=3,727°.

Figure 11:
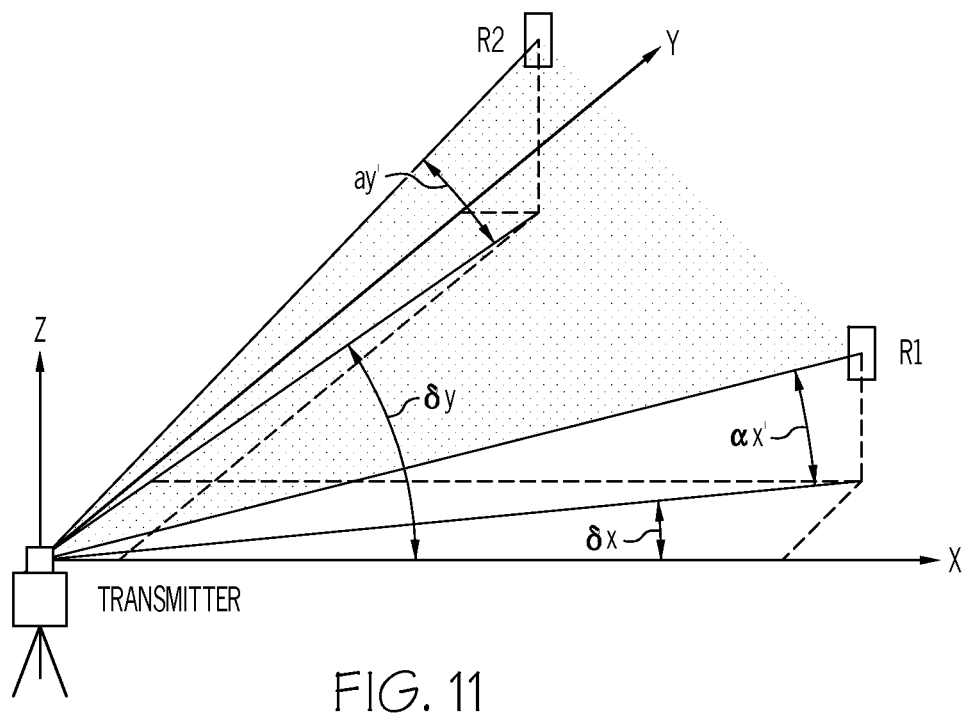

Now, turning to a grade rake dual axis situation, two receivers are used, as shown in FIG. 11. The user setup positions the receiver 2 around the y+ axis and receiver 1 around the X+ axis. Additionally, there is no need that both receivers are located in a perpendicular angle to each other. The transmitter scans both receiver positions and levels to the desired grade values. The slopes are aligned between the transmitter and the receivers (not in the transmitter-axes).

Given:
Position transmitter: P0=(0/0/0)
Position receiver 1: P1=(20/3/1)
Position receiver 2: P2=(4/20/2)
The plane in 3D-coordinates is defined by f(x,y)=ax+by+z (3 unknown values and 3 given points→3 formulas).
Here: f(x,y)=0.0361x+0.0928y
Accordingly the following angles can be calculated for verification:

$$\delta x = \arctan\left(\frac{P1y}{P1x}\right) = \arctan\left(\frac{3}{20}\right) = 8,531°$$

$$\delta y = \arctan\left(\frac{P2y}{P2x}\right) = \arctan\left(\frac{20}{4}\right) = 78,69°$$

$$\alpha x' = \arctan\left(\frac{P1z}{\sqrt{P1x^2+P1y^2}}\right) = \arctan\left(\frac{1}{\sqrt{400+9}}\right) = 2,831°$$

$$\alpha y' = \arctan\left(\frac{P2z}{\sqrt{P2x^2+P2y^2}}\right) = \arctan\left(\frac{2}{\sqrt{16+400}}\right) = 5,6°$$

$$\alpha x = \arctan(a) = \arctan(0,0361) = 2,067°$$

$$\alpha y = \arctan(b) = \arctan(0,0928) = 5,3°$$

The following procedure may be used to achieve the desired values αx' and αy':
First, take two measurements with receiver 1:
1. measurement:

$$\alpha y1 = 0$$

$$\alpha x1 = \arctan\left(\frac{P1z}{P1x}\right) = \arctan\left(\frac{1}{20}\right) = 2,862°$$

2. measurement:

$$\alpha x2 = 0$$

$$\alpha y2 = \arctan\left(\frac{P1z}{P1y}\right) = \arctan\left(\frac{1}{3}\right) = 18,435°$$

→use the formula for δ (F5)

$$\delta x = \arctan\left(\frac{\tan \alpha x2 - \tan \alpha x1}{\tan \alpha y1 - \tan \alpha y2}\right) = \arctan\left(\frac{0 - \tan(2,862°)}{0 - \tan(18,435°)}\right) = 8,531°$$

Next apply the same procedure for receiver 2
δy=78.69°
The user chooses:
αx'=2.831°
αy'=5.6°
Use (F2):

$$\tan(\alpha y) = \frac{\tan(\alpha x') \cdot \sqrt{1+\tan^2(\delta x)} - \tan(\alpha y') \cdot \sqrt{1+\tan^2(\delta y)}}{\tan(\delta x) - \tan(\delta y)}$$

$$\alpha y = \arctan\left(\frac{\tan(2,831°) \cdot \sqrt{1+\tan^2(8,531°)} -}{\tan(8,531°) - \tan(78,69°)}\right)$$

$$= 5,3°$$

Use (F1)

$$\tan(\alpha x) = \tan(\alpha y') \cdot \sqrt{1+\tan^2(\delta y)} - \tan(\alpha y) \cdot \tan(\delta y)$$

$$\alpha x = \arctan(\tan(5,6°) \cdot \sqrt{1+\tan^2(78,69°)} - \tan(5,3°) \cdot \tan(78,69°)) = 2,067°$$

In conclusion, the transmitter will level to αx=2.067° and αy=5.3°, and this results in αx'=2.831° and αy'=5.6°, which is what was desired.

Figure 12:
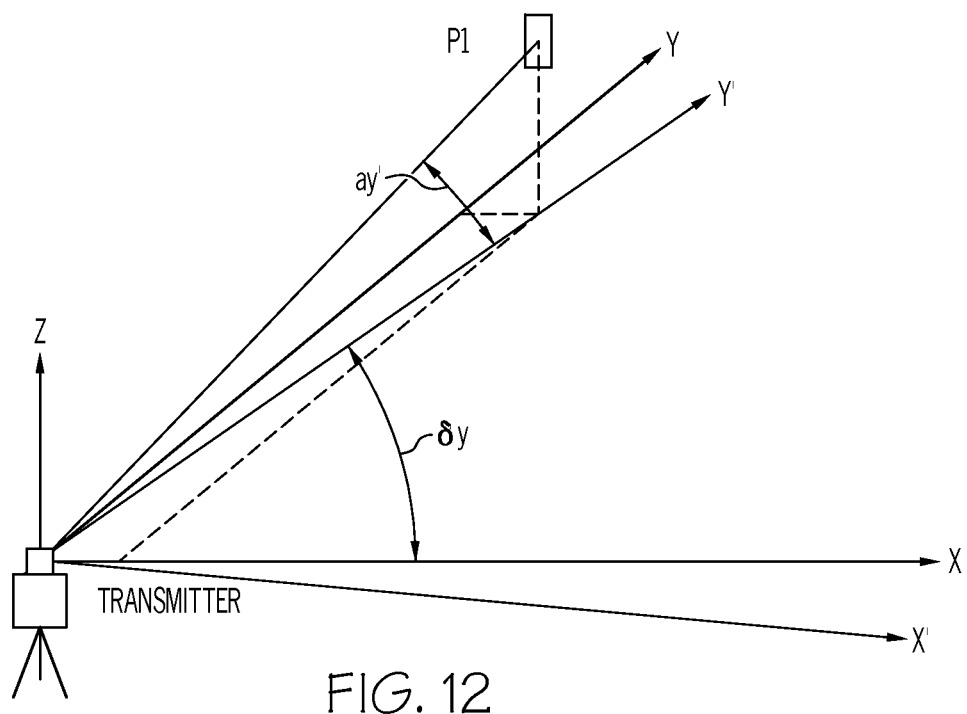

Reference is made to FIG. 12, which illustrates a grade match with a single axis. The transmitter scans the position of the receiver and level to "on grade". The slope between transmitter and receiver is shown in the corresponding axis display. The other axis is 0°.

Given:
Position transmitter: P0=(0/0/0)
Position receiver 1: P1=(4/20/2) to get the direction of the αy'-axis angle δ can be calculated for the verification:

$$\delta y = \arctan\left(\frac{P1y}{P1x}\right) = \arctan\left(\frac{20}{4}\right) = 78,69°$$

The procedure to get the angle δ by taking two different measurements is as follows:
1. measurement:

$$\alpha x1 = 0$$
$$\alpha y1 = \arctan\left(\frac{P1z}{P1y}\right) = \arctan\left(\frac{2}{20}\right) = 5,711°$$

This is known by the transmitter after "on grade" signal is received by the laser receiver.
2. measurement:

$$\alpha y2 = 0$$
$$\alpha x2 = \arctan\left(\frac{P1z}{P1x}\right) = \arctan\left(\frac{2}{4}\right) = 26,565°$$

This is known by the transmitter after an on grade signal is received by the laser receiver.
→Calculate δ with (F5):

$$\delta y = \arctan\left(\frac{\tan \alpha x2 - \tan \alpha x1}{\tan \alpha y1 - \tan \alpha y2}\right) = \arctan\left(\frac{\tan(26,565) - 0}{\tan(5,711°) - 0}\right) = 78,69°$$

The transmitter levels to "on grade" with x-axis=0°.

$$\alpha x1 = 0$$
$$\alpha y1 = \arctan\left(\frac{P1z}{P1y}\right) = \arctan\left(\frac{2}{20}\right) = 5,711°$$

This is known by the transmitter after on grade signal is received by the laser receiver.
Use (F4)

$$\tan(\alpha y') = \frac{\tan(\alpha x) + \tan(\alpha y) \cdot \tan(\delta y)}{\sqrt{1 + \tan^2(\delta y)}}$$

$$\alpha y' = \arctan\left(\frac{\tan(0°) + \tan(5,711°) \cdot \tan(78,69°)}{\sqrt{1 + \tan^2(78,69°)}}\right)$$
$$= 5,6°$$

Figure 13:
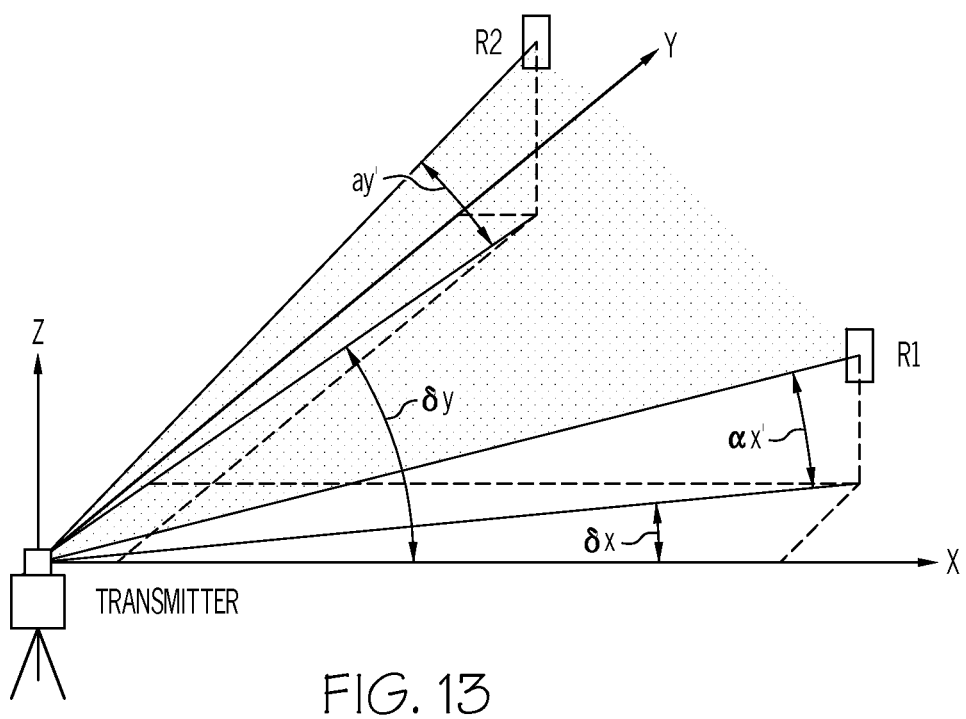

The transmitter will show 5.6° in the display→(alignment transmitter & receiver).
The true αy (transmitter-axis) is 5.711°.
Reference is made to FIG. 13 which illustrates a grade match with using two axes. Receivers R1 and R2 are positioned by the user. The transmitter will display the angles αx' and αy' after this function is completed.
Given:
Position transmitter: P0=(0/0/0)
Position receiver 1: P1=(20/3/1)
Position receiver 2: P2=(4/20/2)

The plane in 3D-coordinates is defined by f(x,y)=ax+by+z(3 unknown values and 3 given points 3 formulas)
Here: f(x,y)=0.0361x+0.0928y
Accordingly the following angles can be calculated for verification:

$$\delta x = \arctan\left(\frac{P1y}{P1x}\right) = \arctan\left(\frac{3}{20}\right) = 8,531°$$

$$\delta y = \arctan\left(\frac{P2y}{P2x}\right) = \arctan\left(\frac{20}{4}\right) = 78,69°$$

$$\alpha x' = \arctan\left(\frac{P1z}{\sqrt{P1x^2 + P1y^2}}\right) = \arctan\left(\frac{1}{\sqrt{400 + 9}}\right) = 2,831°$$

$$\alpha y' = \arctan\left(\frac{P2z}{\sqrt{P2x^2 + P2y^2}}\right) = \arctan\left(\frac{2}{\sqrt{16 + 400}}\right) = 5,6°$$

$$\alpha x = \arctan(a) = \arctan(0,0361) = 2,067°$$
$$\alpha y = \arctan(b) = \arctan(0,0928) = 5,301°$$

The procedure to obtain the desired values αx' and αy' is as follows.
First, switch R1 on, and take two measurements:
1. measurement:

$$\alpha y1 = 0$$
$$\alpha x1 = \arctan\left(\frac{P1z}{P1x}\right) = \arctan\left(\frac{1}{20}\right) = 2,862°$$

2. measurement:

$$\alpha x2 = 0$$
$$\alpha y2 = \arctan\left(\frac{P1z}{P1y}\right) = \arctan\left(\frac{1}{3}\right) = 18,435°$$

→use the formula for δ (F5)

$$\delta x = \arctan\left(\frac{\tan \alpha x2 - \tan \alpha x1}{\tan \alpha y1 - \tan \alpha y2}\right) = \arctan\left(\frac{0 - \tan(2,862)}{0 - \tan(18,435)}\right) = 8,531°$$

Next, use the same procedure for receiver 2 to obtain:

δy=78.69°

Finally, level to "on grade" with both receivers.
Calculation of αx' and αy' is then performed.
The values αx and αy are given by the transmitter.
→Use formulas (F3) & F(4):

$$\alpha x' = \arctan\left(\frac{\tan(2,067°) + \tan(5,301°) \cdot \tan(8,531°)}{\sqrt{1 + \tan^2(8,531°)}}\right)$$
$$= 2,831°$$

$$\alpha y' = \arctan\left(\frac{\tan(2,067°) + \tan(5,301°) \cdot \tan(78,69°)}{\sqrt{1 + \tan^2(78,69°)}}\right)$$
$$= 5,6°$$

Whereas particular embodiments have been described above for purposes of illustration, it will be appreciated by those skilled in the art that numerous variations may be made, and that such variations will be encompassed by the appended claims.

What is claimed is:

1. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected by first and second detectors, comprising the steps of:

defining a first alignment direction from said transmitter by positioning said first detector in said first alignment direction for illumination with said plane of laser light;

defining a second alignment direction from said transmitter by positioning said second detector in said second alignment direction for illumination with said plane of laser light;

determining with a processor the orientation of said first alignment direction with respect to said first and second transmitter axes;

determining with a processor the orientation of said second alignment direction with respect to said first and second transmitter axes, including the steps of determining the inclination in the direction of said first and second transmitter axes of a first plane which is detected by the second detector, and determining the inclination in the direction of said first and second transmitter axes of a second plane which is detected by the second detector;

specifying the desired orientation of said reference plane in said first and second alignment directions;

determining with a processor the angular orientation of said reference plane with respect to said first transmitter axis and with respect to said second transmitter axis needed to position said reference plane in said desired orientation; and orienting said reference plane with respect to said first and second transmitter axes such that said desired orientation of said reference plane in said first and second alignment directions is achieved.

2. The method of claim 1, in which said step of determining the orientation of said first alignment direction with respect to said first and second transmitter axes includes the steps of:

determining the inclination in the direction of said first and second transmitter axes of a first plane which is detected by the first detector, and determining the inclination in the direction of said first and second transmitter axes of a second plane which is detected by the first detector.

3. The method of claim 1 in which the step of determining the angular orientation of said reference plane with respect to said first transmitter axis and with respect to said second transmitter axis needed to position said reference plane in said desired orientation comprises the step of using the equations:

$$\tan(\alpha y) = \frac{\tan(\alpha x') \cdot \sqrt{1+\tan^2(\delta x)} - \tan(\alpha y') \cdot \sqrt{1+\tan^2(\delta y)}}{\tan(\delta x) - \tan(\delta y)}$$

and $$\tan(\alpha x) = \frac{\tan(\alpha y')}{\cos(\delta y)} - \tan(\alpha y) \cdot \tan(\delta y)$$

where $\alpha x'$ and $\alpha y'$ are the orientations of the reference plane along the first and second alignment directions, $\delta x$ and $\delta y$ are the rake angels of the first and second alignment axes with respect to the first transmitter axis, and $\alpha x$ and $\alpha y$ are the orientations of the reference plane along the first and second transmitter axes.

4. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected by first and second detectors, comprising the steps of:

defining a first alignment direction from said transmitter by positioning said first detector in said first alignment direction for illumination with said plane of laser light, said first detector further defining the grade of the reference plane of laser light by its vertical position with respect to said transmitter;

defining a second alignment direction from said transmitter by positioning said second detector in said second alignment direction for illumination with said plane of laser light, said second detector further defining the grade of the reference plane of laser light by its vertical position with respect to said transmitter;

determining with a processor the orientation of said first alignment direction with respect to said first and second transmitter axes;

determining with a processor the orientation of said second alignment direction with respect to said first and second transmitter axes, including the steps of determining the inclination in the direction of said first and second transmitter axes of a first plane which is detected by the second detector, and determining the inclination in the direction of said first and second transmitter axes of a second plane which is detected by the second detector;

orienting said reference plane in said first alignment direction such that said first detector is illuminated;

orienting said reference plane in said second alignment direction such that said second detector is illuminated;

determining with a processor the angular orientation of said reference plane with respect to said first transmitter axis and with respect to said second transmitter axis that results when both said first detector and said second detector are simultaneously illuminated; and determining with a processor the resulting orientation of said reference plane in both said first alignment direction and said second alignment direction.

5. The method of claim 4, in which said step of determining the orientation of said first alignment direction with respect to said first and second transmitter axes includes the steps of:

determining the inclination of the direction of said first and second transmitter axes of a first plane which is detected by the first detector, and determining the inclination of the direction of said first and second transmitter axes of a second plane which is detected by the first detector.

6. The method of claim 4 in which the step determining the resulting orientation of said reference plane in both said first alignment direction and said second alignment direction comprises the step of using the equations:

$$\tan(\alpha y') = \frac{\tan(\alpha x) + \tan(\alpha y) \cdot \tan(\delta y)}{\sqrt{1+\tan^2(\delta y)}}$$

and

-continued $$\tan(\alpha x') = \frac{\tan(\alpha x) + \tan(\alpha y) \cdot \tan(\delta x)}{\sqrt{1 + \tan^2(\delta x)}}$$

where αx' and αy' are the orientations of the reference plane along the first and second alignment directions, δx and δy are the rake angles of the first and second alignment axes with respect to the first transmitter axis, and αx and αy are the orientations of the reference plane along the first and second transmitter axis.

7. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected by first and second detectors, comprising the steps of:
defining a first alignment direction from said transmitter by positioning said first detector in said first alignment direction for illumination with said plane of laser light;
defining a second alignment direction from said transmitter by positioning said second detector in said second alignment direction for illumination with said plane of laser light;
determining with a processor the orientation of said first alignment direction with respect to said first and second transmitter axes;
determining with a processor the orientation of said second alignment direction with respect to said first and second transmitter axes;
specifying the desired orientation of said reference plane in said first and second alignment directions;
determining with a processor the angular orientation of said reference plane with respect to said first transmitter axis and with respect to said second transmitter axis needed to position said reference plane in said desired orientation using the equations:

$$\tan(\alpha y) = \frac{\tan(\alpha x') \cdot \sqrt{1 + \tan^2(\delta x)} - \tan(\alpha y') \cdot \sqrt{1 + \tan^2(\delta y)}}{\tan(\delta x) - \tan(\delta y)}$$

and $$\tan(\alpha x) = \frac{\tan(\alpha y')}{\cos(\delta y)} - \tan(\alpha y) \cdot \tan(\delta y)$$

where αx' and αy' are the orientations of the reference plane along the first and second alignment directions, δx and δy are the rake angles of the first and second alignment axes with respect to the first transmitter axis, and αx and αy are the orientations of the reference plane along the first and second transmitter axes; and
orienting said reference plane with respect to said first and second transmitter axes such that said desired orientation of said reference plane in said first and second alignment directions is achieved.

8. The method of claim 7, in which said step of determining the orientation of said first alignment direction with respect to said first and second transmitter axes includes the steps of:
determining the inclination in the direction of said first and second transmitter axes of a first plane which is detected by the first detector, and
determining the inclination in the direction of said first and second transmitter axes of a second plane which is detected by the first detector.

9. The method of claim 7, in which said step of determining the orientation of said second alignment direction with respect to said first and second transmitter axes includes the steps of:
determining the inclination in the direction of said first and second transmitter axes of a first plane which is detected by the second detector, and
determining the inclination in the direction of said first and second transmitter axes of a second plane which is detected by the second detector.

10. A method of orienting a reference plane of laser light generated by a transmitter, the transmitter including a positioning arrangement that adjusts the angular orientation of the reference plane with respect to a first transmitter axis and with respect to a second transmitter axis perpendicular thereto, the laser light being detected by first and second detectors, comprising the steps of:
defining a first alignment direction from said transmitter by positioning said first detector in said first alignment direction for illumination with said plane of laser light, said first detector further defining the grade of the reference plane of laser light by its vertical position with respect to said transmitter;
defining a second alignment direction from said transmitter by positioning said second detector in said second alignment direction for illumination with said plane of laser light, said second detector further defining the grade of the reference plane of laser light by its vertical position with respect to said transmitter;
determining with a processor the orientation of said first alignment direction with respect to said first and second transmitter axes;
determining with a processor the orientation of said second alignment direction with respect to said first and second transmitter axes;
orienting said reference plane in said first alignment direction such that said first detector is illuminated;
orienting said reference plane in said second alignment direction such that said second detector is illuminated;
determining with a processor the angular orientation of said reference plane with respect to said first transmitter axis and with respect to said second transmitter axis that results when both said first detector and said second detector are simultaneously illuminated; and
determining with a processor the resulting orientation of said reference plane in both said first alignment direction and said second alignment direction using the equations:

$$\tan(\alpha y') = \frac{\tan(\alpha x) + \tan(\alpha y) \cdot \tan(\delta y)}{\sqrt{1 + \tan^2(\delta y)}}$$

and $$\tan(\alpha x') = \frac{\tan(\alpha x) + \tan(\alpha y) \cdot \tan(\delta x)}{\sqrt{1 + \tan^2(\delta x)}}$$

where αx' and αy' are the orientations of the reference plane along the first and second alignment directions, δx and δy are the rake angles of the first and second alignment axes with respect to the first transmitter axis, and αx and αy are the orientations of the reference plane along the first and second transmitter axes.

11. The method of claim 10, in which said step of determining the orientation of said first alignment direction with respect to said first and second transmitter axes includes the steps of:

determining the inclination in the direction of said first and second transmitter axes of a first plane which is detected by the first detector, and determining the inclination in the direction of said first and second transmitter axes of a second plane which is detected by the first detector.

12. The method of claim 10, in which said step of determining the orientation of said second alignment direction with respect to said first and second transmitter axes includes the steps of:

determining the inclination in the direction of said first and second transmitter axes of a first plane which is detected by the second detector, and determining the inclination in the direction of said first and second transmitter axes of a second plane which is detected by the second detector.

* * * * *